US011073358B2

(12) United States Patent
Chin

(10) Patent No.: US 11,073,358 B2
(45) Date of Patent: Jul. 27, 2021

(54) QUICK-DISCONNECT SLING SWIVEL

(71) Applicant: Strike Industries, Inc., Santa Ana, CA (US)

(72) Inventor: David Chin, Santa Ana, CA (US)

(73) Assignee: Strike Industries, Inc., Santa Ana, CA (US)

( * ) Notice: Subject to any disclaimer, the term of this patent is extended or adjusted under 35 U.S.C. 154(b) by 1 day.

(21) Appl. No.: 16/748,748

(22) Filed: Jan. 21, 2020

(65) Prior Publication Data

US 2020/0232751 A1 Jul. 23, 2020

Related U.S. Application Data

(60) Provisional application No. 62/794,879, filed on Jan. 21, 2019.

(51) Int. Cl.
*F41C 23/02* (2006.01)
*F16B 21/06* (2006.01)
*F41C 33/00* (2006.01)
*F16B 21/16* (2006.01)

(52) U.S. Cl.
CPC .............. *F41C 23/02* (2013.01); *F16B 21/06* (2013.01); *F41C 33/002* (2013.01); *F16B 21/165* (2013.01)

(58) Field of Classification Search
CPC ........ F41C 23/02; F41C 33/002; F16B 21/06; F16B 21/076; F16B 21/08; F16B 21/065; F16B 21/086
See application file for complete search history.

(56) References Cited

U.S. PATENT DOCUMENTS

| | | | | | |
|---|---|---|---|---|---|
| 4,988,248 A | * | 1/1991 | Flux | ........................ | F16B 21/16 280/507 |
| 5,067,267 A | * | 11/1991 | Ives | ........................ | F41C 23/02 42/85 |
| 5,207,544 A | * | 5/1993 | Yamamoto | .......... | B60R 21/2035 411/348 |
| 5,615,462 A | * | 4/1997 | Goto | ...................... | G10G 5/005 224/257 |
| 6,511,100 B1 | * | 1/2003 | Le Clinche | ............. | F16L 37/23 285/314 |
| 6,551,041 B2 | * | 4/2003 | Choate | ................ | A62B 35/0068 24/453 |
| 7,654,027 B1 | * | 2/2010 | Grover | .................... | F41C 23/02 42/85 |
| 7,914,225 B2 | * | 3/2011 | Hageman | .............. | F16B 19/109 403/322.2 |

(Continued)

*Primary Examiner* — Corey N Skurdal
(74) *Attorney, Agent, or Firm* — Andy M. Han; Han IP PLLC

(57) ABSTRACT

A quick-disconnect (QD) sling swivel includes a main body receivable in a socket on a firearm, a locking mechanism coupled to the main body, and an actuation mechanism coupled to the locking mechanism and depressible in a direction generally perpendicular to a longitudinal axis of the QD sling swivel. When the actuation mechanism is depressed, the locking mechanism is in a first position such that the main body is decouplable from and is freely movable in and out of the socket. When the at least one actuation button is not depressed with a portion of the main body received in the socket, the locking mechanism is in a second position such that the main body is interlockingly received in the socket with the locking mechanism engaged therewith.

20 Claims, 2 Drawing Sheets

Note:
- Core 160 and actuation buttons 110A/110B are held/coupled together by a pin 150.
- Springs 170 pushes actuation buttons 110A/110B outwardly away from longitudinal axis of QD sling swivel 100 → core 160 is in a locking/resting/engagement position when actuation buttons 110A/110B are not depressed.
- When core 160 is at the locking/resting/engagement position, at least one detent 140 (e.g., ball detents) is pushed outwardly by core 160 and thus is received in and engaged with groove 250 of socket 200.

(56) References Cited

U.S. PATENT DOCUMENTS

| | | | |
|---|---|---|---|
| 8,516,732 B2* | 8/2013 | Burnsed, Jr. | F41C 33/002 42/85 |
| 9,447,815 B2* | 9/2016 | Roberts | F41C 33/006 |
| 2013/0305582 A1* | 11/2013 | Mayberry | F41C 33/006 42/85 |
| 2018/0087867 A1* | 3/2018 | Tower | F16B 21/165 |

* cited by examiner

QUICK-DISCONNECT SLING SWIVEL

CROSS REFERENCE TO RELATED PATENT APPLICATION(S)

The present disclosure is part of a non-provisional application claiming the priority benefit of U.S. Provisional Patent Application No. 62/794,879 filed on 21 Jan. 2019, the content of which being incorporated by reference in its entirety.

TECHNICAL FIELD

The present disclosure is generally related to firearm accessories and, more particularly, to an improved quick-disconnect (QD) sling swivel.

BACKGROUND

Unless otherwise indicated herein, approaches described in this section are not prior art to the claims listed below and are not admitted as prior art by inclusion in this section.

With respect to firearms, a sling is a type of strap or harness used by a user to carry a firearm on the user's body and to improve usability of the firearm in terms of bracing and stabilization during aiming. In general, the sling can be attached to the firearm in one of several ways such as one or more sling swivel studs, one or more QD or flush cup sling mounts, or one or more snap hooks. In the context of QD or flush cup sling mounts, the term "QD sling swivel" refers to the part attached to the sling, and the term "flush cup" refers to the corresponding receptacle or socket on the firearm for receiving coupling to the QD sling swivel. A QD or flush cup sling mount system typically includes a push button swivel attached to the sling which is placed or received in a mounting socket on the firearm. The swivel is typically kept in place by several ball detents connected to the push button, which press against the walls of the socket. The sling swivel can be connected to and disconnected from the firearm quickly by the user pushing the button to retract the ball detents.

In the existing design of QD sling swivels, the operation seems to be counter intuitive. That is, in order to release the QD sling swivel (to decouple it) from the socket (and hence from the firearm), the user needs to depress the push button in a direction (e.g., down) that is opposite to a direction (e.g., up) in which the QD sling swivel is to be pulled away from the socket (and from the firearm). Moreover, as the sling loop is often a wire form with an open end contained within the housing of the QD sling swivel, it is possible that the sling could be released inadvertently in case a sufficiently significant force is applied to the sling swivel such that the wire form of the sling loop deforms and fails. Also, in the existing design, a single exposed push button is used to actuate the ball detents that secure the barrel of the sling swivel to the coupling points of the socket. The inline nature of the push button may increase the potential of inadvertent decoupling due to the push button being engaged by inadvertent impacts.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of the aforementioned issue, an objective of the present disclosure is to propose an innovative design of an improved QD sling swivel. It is believed that the proposed design can avoid or otherwise minimize aforementioned issues with the existing design of QD sling swivels.

A sling swivel under the proposed design allows a user of a firearm equipped with a sling to quickly attach the sling to the firearm by inserting a barrel of the sling swivel into a flush cup (herein interchangeably referred to as "receptacle", "socket" and "coupling point"). When an actuation mechanism of the sling swivel is activated from two opposite directions perpendicular to a longitudinal axis of the swing swivel, by using two fingers for example, ball detents of the sling swivel are allowed to retract into the barrel, thereby allowing removal of the sling swivel from the coupling point along the longitudinal axis.

In one aspect, a device implementable on a firearm may include a QD sling swivel comprising In one aspect, a device implementable on a firearm may include a QD sling swivel comprising a main body, a locking mechanism, and an actuation mechanism. The main body may be configured with a hollow therein and may have a first distal end and a second distal end opposite the first distal end such that at least a portion of the main body near the second distal end thereof may be receivable in a socket on the firearm. The locking mechanism may include a core and at least one detent. The core may be slidingly movable through the hollow of the main body along a longitudinal axis of the QD sling swivel between an engagement position and a disengagement position. The at least one detent may be movable between a first position and a second position in a radial direction perpendicular to the longitudinal axis of the QD sling swivel. The actuation mechanism may include at least one actuation button coupled to the core and mounted on the first distal end of the main body. The at least one actuation button may be elastically depressible in a direction generally perpendicular to the longitudinal axis of the QD sling swivel. When the at least one actuation button is depressed, the core may move in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket. When the at least one actuation button is not depressed with the second distal end of the main body received in the socket, the core may be at the engagement position and the main body is interlockingly received in the socket with the at least one detent at the first position.

In another aspect, a device implementable on a firearm may include a QD sling swivel comprising a main body receivable in a socket on the firearm, a locking mechanism coupled to the main body, and an actuation mechanism coupled to the locking mechanism and depressible in a direction generally perpendicular to a longitudinal axis of the QD sling swivel. When the actuation mechanism is depressed, the locking mechanism may be in a first position such that the main body is decouplable from and is freely movable in and out of the socket. When the at least one actuation button is not depressed with a portion of the main body received in the socket, the locking mechanism may be in a second position such that the main body is interlockingly received in the socket with the locking mechanism engaged therewith.

In yet another aspect, a device implementable on a firearm may include a QD sling swivel comprising a main body, a locking mechanism coupled to the main body, and an actuation mechanism coupled to the locking mechanism. The main body may be configured with a hollow therein and may have a first distal end and a second distal end opposite the first distal end with at least a portion of the main body near the second distal end thereof is receivable in a socket on the firearm. The locking mechanism may include a core slidingly movable through the hollow of the main body along a longitudinal axis of the QD sling swivel between an engagement position and a disengagement position. The actuation mechanism may include at least one actuation button that is depressible in a direction generally perpendicular to a longitudinal axis of the QD sling swivel. The first distal end of the main body may be configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED IMPLEMENTATIONS

Figure 1:
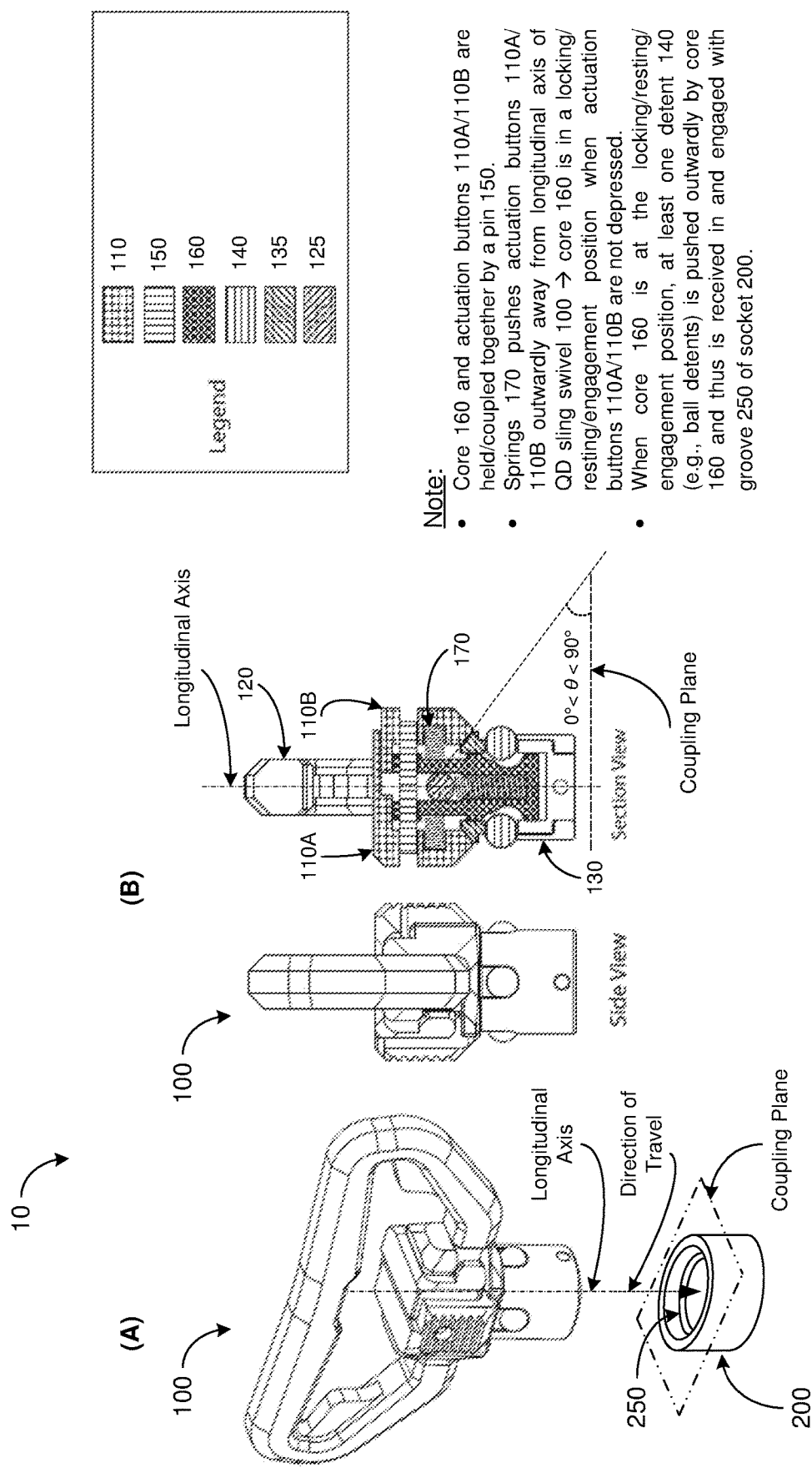
FIG. 1 is a diagram of an example scenario of a QD sling swivel in operation in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

The position terms used in the present disclosure, such as "front", "forward", "rear", "back", "top", "bottom", "left", "right", "head", "tail" or the like assume a firearm in the normal firing position, with the firearm being in a position in which the longitudinal axis of the barrel of the firearm runs generally horizontally and the direction of firing points "forward" away from the operator or user of the firearm. The same convention applies for the direction statements used herein.

As used herein, the terms "proximal" and "proximally" may denote "forward" and "forwardly" with respect to the firearm, and the terms "distal" and "distally" may denote "rearward" and "rearwardly" with respect to the firearm. As used herein, the verb "to comprise" in this description, claims, and other conjugations are used in its non-limiting sense to mean those items following the word are included, but items not specifically mentioned are not excluded. As used herein, the word "forward" means moving in the direction that the projectile moves during firing a firearm. As used herein, the word "proximal" means closer to the reference point, in this case, the shooter. As used herein, the word "distal" means farther to the reference point, in this case, the shooter. Reference to an element by the indefinite article "a" or "an" does not exclude the possibility that more than one of the elements are present, unless the context clearly requires that there is one and only one of the elements. The indefinite article "a" or "an" thus usually means "at least one." Additionally, the words "a" and "an" when used in the present document in concert with the words "comprising" or "containing" denote "one or more.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure. The recitation of numerical ranges by endpoints includes all numbers within that range (e.g. 1 to 5 includes 1, 1.5, 2, 2.75, 3, 3.80, 4, and 5). All dimensions given herein are by way of examples to better illustrate the present disclosure embodiments and shall not be construed to limit the dimensions of the present disclosure embodiments to the given numeric values.

Overview

In a proposed design of an improved QD sling swivel in accordance with the present disclosure, an actuation mechanism used to release or disconnect the sling swivel from a corresponding receptable or socket (and hence firearm) is actuated in one or more directions that are generally perpendicular to a longitudinal axis of the sling swivel which is also a direction of travel of the sling swivel to couple to and decouple from the receptable or socket. The proposed design allows a user to use a more intuitive pinch grip to couple and decouple the sling swivel. Furthermore, the proposed design of actuation provides a very secure hold, and it is believed that the proposed design is more intuitive for users to understand and operate. Another benefit enabled by the proposed design is that the construction of the QD sling swivel allows for a manufacturer to use a much stronger machined loop that is close-ended, thereby greatly increasing the load bearing capability of the sling swivel.

In the illustrated examples of the proposed design, two horizontally-opposed actuation buttons, rather than a single solitary in-line button, are utilized as the actuation mechanism for decoupling the QD sling swivel from the socket. To actuate the mechanism to decouple the QD sling swivel from the socket (and hence from the firearm), a user is required to apply two opposing forces that are generally parallel to a coupling surface, thereby avoiding, eliminating or otherwise minimizing the risk of the actuation mechanism being engaged through impact or pressure without intention. In the proposed design, the two horizontally-opposed actuation buttons are placed under mechanical disadvantage as well as spring force to remain locked in place. Accordingly, to decouple the QD sling swivel from the socket, the user would apply specific and opposing forces on the two horizontally-opposed actuation buttons (e.g., by pinching the horizontally opposed buttons with two fingers). Advantageously, the risk of inadvertent actuation, as well as the resultant decoupling, is greatly reduced. Thus, even if one of the actuation were to be depressed through unintentional impact, the other actuation button would maintain the locked resting state.

ILLUSTRATIVE EXAMPLES

Figure 2:
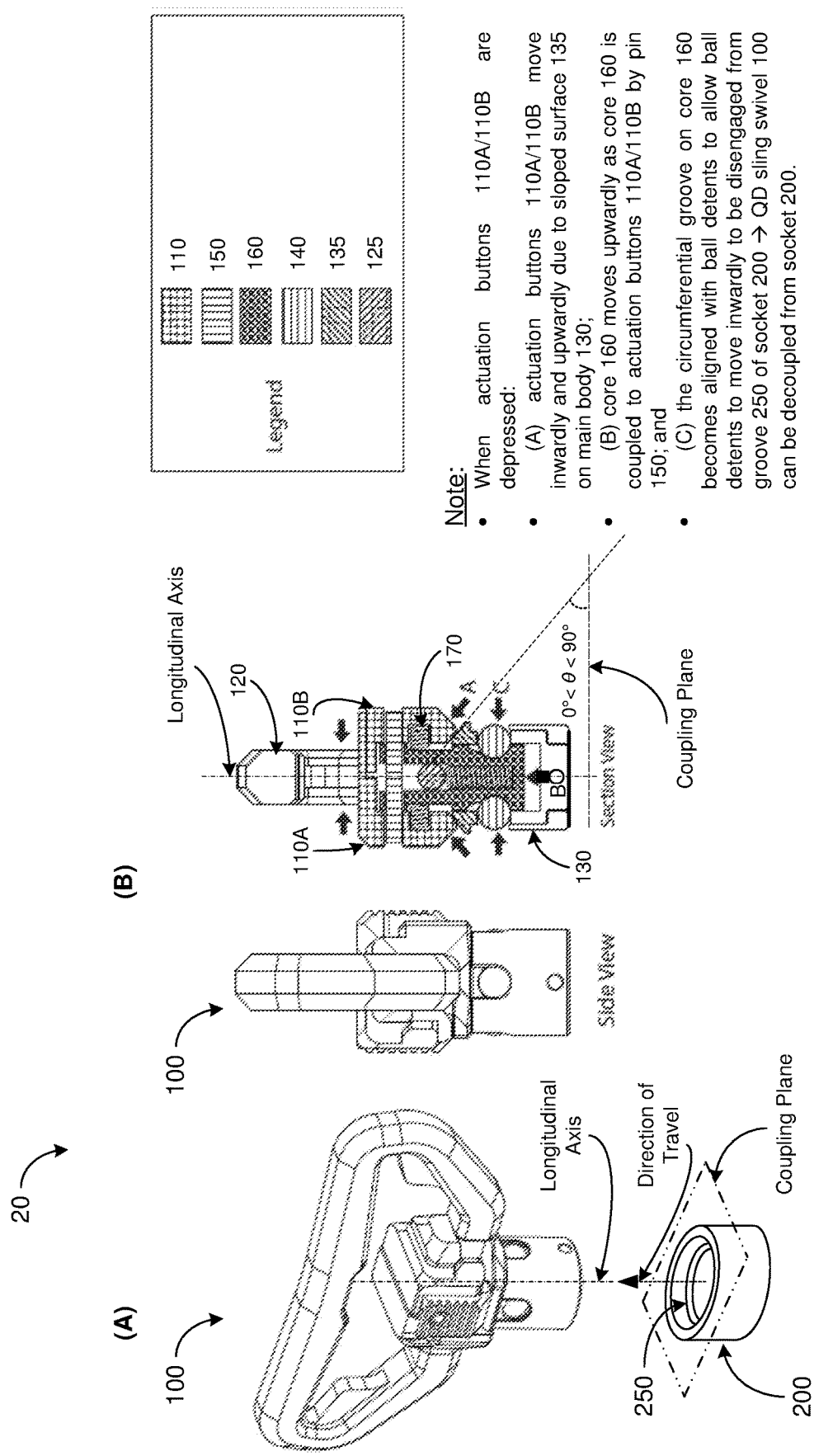
FIG. 2 is a diagram of an example scenario of a QD sling swivel in operation in accordance with an implementation of the present disclosure.

FIG. 1 illustrates an example scenario 10 of a QD sling swivel 100 in operation in accordance with an implementation of the present disclosure. In particular, scenario 10 illustrates QD sling swivel 100 in a resting or locking position. Part (A) of FIG. 1 shows QD sling swivel 100 moving in a direction of travel toward a socket 200 on a firearm to be coupled to socket 200. Part (B) of FIG. 1 shows a side view and a sectional view of QD sling swivel 100 in a resting/locking/engagement configuration. FIG. 2 illustrates an example scenario 20 of QD sling swivel 100 in operation in accordance with an implementation of the present disclosure. In particular, scenario 20 illustrates QD sling swivel 100 in a pressed or unlocking position. Part (A) of FIG. 2 shows QD sling swivel 100 moving in a direction of travel away from socket 200 to be decoupled from socket 200. Part (B) of FIG. 2 shows a side view and a sectional view of QD sling swivel 100 in a pressed/unlocking/disengagement configuration. Description of QD sling swivel 100 is provided below with reference to FIG. 1 and FIG. 2.

In accordance with an implementation of the present disclosure, QD sling swivel 100 may include an actuation mechanism which may include at least one actuation button 110 (which, for illustrative purposes only and without limiting the scope of the present disclosure, is shown as a first actuation button 110A and a second actuation button 110B in FIG. 1 and FIG. 2), a pin 150 and one or more springs 170. Moreover, QD sling swivel 100 may include a close-ended loop 120, a main body 130, and a locking mechanism which may include at least one detent 140 and a core 160. QD sling swivel 100 may be implementable on a firearm (e.g., a rifle, a carbine, a shotgun or a pistol). As shown in FIG. 1 and FIG. 2, a portion 125 of loop 120 may traverse through main body 130 and core 160 to couple loop 120 thereto. Thus, with a strap or harness looped through the close-ended loop 120, QD sling swivel 100 may couple the sling or harness to the firearm with at least a portion of main body 130 received in a socket 200 on the firearm. Socket 200 may be a built-in or integral part of the firearm. Alternatively, socket 200 may be an add-on accessory mounted or otherwise installed on the firearm.

In some implementations in accordance with the present disclosure, main body 130 may be configured with a hollow therein and may have a first distal end (e.g. upper end shown in FIG. 1 and FIG. 2) and a second distal end (e.g., lower end shown in FIG. 1 and FIG. 2) opposite the first distal end such that at least a portion of main body 130 near the second distal end thereof may be receivable in socket 200. Although main body 130 may be generally cylindrical in shape, as shown in FIG. 1 and FIG. 2, main body 130 may be in a different shape in various implementations (e.g., generally rectangular).

In some implementations in accordance with the present disclosure, core 160 may be at least partially received in the hollow of main body 130 to be slidingly movable through the hollow of the main body along a longitudinal axis of QD sling swivel 100 between an engagement position (e.g., a lower position as shown in FIG. 1) and a disengagement position (e.g., an upper position as shown in FIG. 2). The at least one detent 140 may be movable between a first position (e.g., an outward position as shown in FIG. 1) and a second position (e.g., an inward position as shown in FIG. 2) in a radial direction perpendicular to the longitudinal axis of QD sling swivel 100.

In some implementations in accordance with the present disclosure, the at least one actuation button 110 may be coupled to core 160 and mounted on the first distal end of main body 130. The at least one actuation button 110 may be elastically depressible in a direction generally perpendicular to the longitudinal axis of QD sling swivel 100 (e.g., inwardly toward the longitudinal axis of QD sling swivel 100). When the at least one actuation button 100 is depressed, core 160 may move in main body 130 in a longitudinal direction along the longitudinal axis of QD sling swivel 100 from the second distal end toward the first distal end to the disengagement position with the at least one detent 140 at the second position such that main body 130 is decouplable from and is freely movable in and out of socket 200. When the at least one actuation button 110 is not depressed with the second distal end of main body 130 received in socket 200, core 160 may be at the engagement position and main body 130 may be interlockingly received in socket 200 with the at least one detent 140 at the first position.

In some implementations in accordance with the present disclosure, when the at least one actuation button is depressed, core 160 may move in main body 130 in the longitudinal direction from the second distal end toward the first distal end.

In some implementations in accordance with the present disclosure, the at least one actuation button 110 may include a first actuation button 110A and a second actuation button 110B. Additionally, the actuation mechanism may also include one or more springs 170 disposed between the first actuation button 110A and the second actuation button 110B and exerting a force that pushes the first actuation button 110A and the second actuation button 110B away from the longitudinal axis of QD sling swivel 100. Moreover, main body 130 may be decouplable from socket 200 when the first actuation button 110A and the second actuation button 110B are depressed in opposite directions towards the longitudinal axis of QD sling swivel 100.

In some implementations in accordance with the present disclosure, the actuation mechanism may further include a pin 150 that couples the at least one actuation button 110 and core 160 together. In the example shown in FIG. 1 and FIG. 2, pin 150 may couple the first actuation button 110A, the second actuation button 110B and core 160 together.

In some implementations in accordance with the present disclosure, the at least one detent 140 may include a plurality of ball detents that may be at least partially receivable in a groove 250 on an inner wall of socket 200 when the second distal end of main body 130 is received in and coupled to socket 200. In such cases, an outer surface of core 160 may have one or more indentations (e.g., a circumferential groove) configured to accommodate the plurality of ball detents such that, when core 160 is at the engagement position, the ball detents are pushed outward by core 160 to engage with the groove 250 on socket 200 and, when core 160 is at the disengagement position, the ball detents are freely movable into the one or more indentations to disengagement from the groove 250 on socket 200.

In some implementations in accordance with the present disclosure, the first distal end of main body 130 may be configured with a sloped surface 135 on which the at least one actuation button 110 is slidingly movable toward and away from the longitudinal axis of QD sling swivel 100 such that, when depressed, the at least one actuation button 100 moves in a direction that is toward the longitudinal axis of QD sling swivel 100 and away from the second distal end of main body 130. In some implementations, an angle of the sloped surface may be greater than 0 degree and less than 90 degrees relative to a coupling plane which is perpendicular to the longitudinal direction.

As shown in FIG. 1 and FIG. 2, the sloped surface 135 of main body 130 may be at an angle θ relative to a coupling plane, 0°<θ<90°. The coupling plane herein refers to a virtual plane that is perpendicular to a direction of travel of QD sling swivel 100 for QD sling swivel 100 to move in and out of socket 200 to engage with or disengage from socket 200. Thus, when QD sling swivel 100 is received in and coupled to socket 200, the longitudinal axis of QD sling swivel 100 may be perpendicular to the coupling plane while being in line or otherwise parallel with the direction of travel. Advantageously, with the sloped surface 135, when the at least one actuation button 110 is depressed by a user toward the longitudinal axis of QD sling swivel 100, the at least on actuation button 110 not only moves toward the longitudinal axis but also moves upward (e.g., away from socket 200). As core 160 is coupled to the at least one actuation button 110 by pin 150, core 160 is also moved upward from its engagement position (e.g., lower position) to disengagement position (e.g., higher position) to be away from socket 200 when the at least one actuation button 110 is depressed. When core 160 is in its disengagement position, the one or more indentations on the outer surface of core 160 (e.g., a circumferential groove) may be aligned with the plurality of ball detents height-wise to provide room for the ball detents to move inwardly toward core 160 to be disengaged from groove 250 of socket 200, thereby allowing QD sling swivel 100 to be decoupled from socket 200 (and hence from the firearm).

Highlight of Select Features

In view of the above, select features of various implementations in accordance with the present disclosure are highlighted below.

In one aspect, a device implementable on a firearm may include a QD sling swivel comprising In one aspect, a device implementable on a firearm may include a QD sling swivel comprising a main body, a locking mechanism, and an actuation mechanism. The main body may be configured with a hollow therein and may have a first distal end and a second distal end opposite the first distal end such that at least a portion of the main body near the second distal end thereof may be receivable in a socket on the firearm. The locking mechanism may include a core and at least one detent. The core may be slidingly movable through the hollow of the main body along a longitudinal axis of the QD sling swivel between an engagement position and a disengagement position. The at least one detent may be movable between a first position and a second position in a radial direction perpendicular to the longitudinal axis of the QD sling swivel. The actuation mechanism may include at least one actuation button coupled to the core and mounted on the first distal end of the main body. The at least one actuation button may be elastically depressible in a direction generally perpendicular to the longitudinal axis of the QD sling swivel. When the at least one actuation button is depressed, the core may move in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket. When the at least one actuation button is not depressed with the second distal end of the main body received in the socket, the core may be at the engagement position and the main body may be interlockingly received in the socket with the at least one detent at the first position.

In some implementations, the first distal end of the main body may be configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

In some implementations, an angle of the sloped surface may be greater than 0 degree and less than 90 degrees relative to a coupling plane which is perpendicular to the longitudinal direction.

In some implementations, when the at least one actuation button is depressed, the core may move in the main body in the longitudinal direction from the second distal end toward the first distal end.

In some implementations, the at least one actuation button may include a first actuation button and a second actuation button. Additionally, the actuation mechanism may also include a spring disposed between the first actuation button and the second actuation button and exerting a force that pushes the first actuation button and the second actuation button away from the longitudinal axis of the QD sling swivel. Moreover, the main body may be decouplable from the socket when the first actuation button and the second actuation button are depressed in opposite directions towards the longitudinal axis of the QD sling swivel.

In some implementations, the actuation mechanism may further include a pin that couples the at least one actuation button and the core together.

In some implementations, the at least one detent may include a plurality of ball detents that are at least partially receivable in a groove on an inner wall of the socket when the second distal end of the main body is received in and coupled to the socket. In such cases, an outer surface of the core may have one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

In another aspect, a device implementable on a firearm may include a QD sling swivel comprising a main body receivable in a socket on the firearm, a locking mechanism coupled to the main body, and an actuation mechanism coupled to the locking mechanism and depressible in a direction generally perpendicular to a longitudinal axis of the QD sling swivel. When the actuation mechanism is depressed, the locking mechanism may be in a first position such that the main body is decouplable from and is freely movable in and out of the socket. When the at least one actuation button is not depressed with a portion of the main body received in the socket, the locking mechanism may be in a second position such that the main body is interlockingly received in the socket with the locking mechanism engaged therewith.

In some implementations, the main body may be configured with a hollow therein and has a first distal end and a second distal end opposite the first distal end with at least a portion of the main body near the second distal end thereof is receivable in the socket. Additionally, the locking mechanism may include a core slidingly movable through the hollow of the main body along a longitudinal axis of the QD sling swivel between an engagement position and a disengagement position. Moreover, the locking mechanism may also include at least one detent movable between a first position and a second position in a radial direction perpendicular to the longitudinal axis of the QD sling swivel. Furthermore, the actuation mechanism may include at least one actuation button coupled to the core and mounted on the first distal end of the main body. When the at least one actuation button is depressed, the core may move in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket. When the at least one actuation button is not depressed with the second distal end of the main body received in the socket, the core may be at the engagement position and the main body may be interlockingly received in the socket with the at least one detent at the first position.

In some implementations, the first distal end of the main body may be configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

In some implementations, an angle of the sloped surface may be greater than 0 degree and less than 90 degrees relative to a coupling plane which is perpendicular to the longitudinal direction.

In some implementations, when the at least one actuation button is depressed, the core may move in the main body in the longitudinal direction from the second distal end toward the first distal end.

In some implementations, the at least one actuation button may include a first actuation button and a second actuation button. In such cases, the actuation mechanism may further include a spring disposed between the first actuation button and the second actuation button and exerting a force that pushes the first actuation button and the second actuation button away from the longitudinal axis of the QD sling swivel. Moreover, the main body may be decouplable from the socket when the first actuation button and the second actuation button are depressed in opposite directions towards the longitudinal axis of the QD sling swivel.

In some implementations, the actuation mechanism may further include a pin that couples the at least one actuation button and the core together.

In some implementations, the at least one detent may include a plurality of ball detents that are at least partially receivable in a groove on an inner wall of the socket when the second distal end of the main body is received in and coupled to the socket. Additionally, an outer surface of the core may have one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

In yet another aspect, a device implementable on a firearm may include a QD sling swivel comprising a main body, a locking mechanism coupled to the main body, and an actuation mechanism coupled to the locking mechanism. The main body may be configured with a hollow therein and may have a first distal end and a second distal end opposite the first distal end with at least a portion of the main body near the second distal end thereof is receivable in a socket on the firearm. The locking mechanism may include a core slidingly movable through the hollow of the main body along a longitudinal axis of the QD sling swivel between an engagement position and a disengagement position. The actuation mechanism may include at least one actuation button that is depressible in a direction generally perpendicular to a longitudinal axis of the QD sling swivel. The first distal end of the main body may be configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

In some implementations, the locking mechanism may also include at least one detent movable between a first position and a second position in a radial direction perpendicular to the longitudinal axis of the QD sling swivel. In such cases, when the at least one actuation button is depressed, the core may move in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket. Moreover, when the at least one actuation button is not depressed with the second distal end of the main body received in the socket, the core may be at the engagement position and the main body may be interlockingly received in the socket with the at least one detent at the first position.

In some implementations, the at least one detent may include a plurality of ball detents that are at least partially receivable in a groove on an inner wall of the socket when the second distal end of the main body is received in and coupled to the socket. In such cases, an outer surface of the core may be configured with one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

In some implementations, an angle of the sloped surface may be greater than 0 degree and less than 90 degrees relative to a coupling plane which is perpendicular to the longitudinal direction.

In some implementations, the actuation mechanism may further include a pin that couples the at least one actuation button and the core together. Moreover, the at least one actuation button may include a first actuation button and a second actuation button. Furthermore, the actuation mechanism may also include a spring disposed between the first actuation button and the second actuation button and exerting a force that pushes the first actuation button and the second actuation button away from the longitudinal axis of the QD sling swivel. Furthermore, the main body may be decouplable from the socket when the first actuation button and the second actuation button are depressed in opposite directions towards the longitudinal axis of the QD sling swivel.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A device implementable on a firearm, comprising:
a quick-disconnect (QD) sling swivel comprising:
   a main body with a hollow therein and having a first distal end and a second distal end opposite the first distal end with at least a portion of the main body near the second distal end thereof is receivable in a socket on the firearm;
   a locking mechanism comprising:
      a core slidingly movable through the hollow of the main body along a longitudinal axis of the QD sling swivel between an engagement position and a disengagement position; and
      at least one detent movable between a first position and a second position in a radial direction perpendicular to the longitudinal axis of the QD sling swivel; and
   an actuation mechanism comprising at least one actuation button coupled to the core and mounted on the first distal end of the main body, the at least one actuation button elastically depressible in a direction generally perpendicular to the longitudinal axis of the QD sling swivel, wherein:
      when the at least one actuation button is depressed, the core moves in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket, and
      when the at least one actuation button is not depressed with the second distal end of the main body received in the socket, the core is at the engagement position and the main body is interlockingly received in the socket with the at least one detent at the first position.

2. The device of claim 1, wherein the first distal end of the main body is configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

3. The scope mount of claim 2, wherein an angle of the sloped surface is greater than 0 degree and less than 90 degrees relative to a coupling plane which is perpendicular to the longitudinal direction.

4. The scope mount of claim 2, wherein, when the at least one actuation button is depressed, the core moves in the main body in the longitudinal direction from the second distal end toward the first distal end.

5. The scope mount of claim 1, wherein the at least one actuation button comprises a first actuation button and a second actuation button, wherein the actuation mechanism further comprises a spring disposed between the first actuation button and the second actuation button and exerting a force that pushes the first actuation button and the second actuation button away from the longitudinal axis of the QD sling swivel, and wherein the main body is decouplable from the socket when the first actuation button and the second actuation button are depressed in opposite directions towards the longitudinal axis of the QD sling swivel.

6. The device of claim 1, wherein the actuation mechanism further comprises a pin that couples the at least one actuation button and the core together.

7. The device of claim 1, wherein the at least one detent comprises a plurality of ball detents that are at least partially receivable in a groove on an inner wall of the socket when the second distal end of the main body is received in and coupled to the socket, and wherein an outer surface of the core has one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

8. A device implementable on a firearm, comprising:
a quick-disconnect (QD) sling swivel comprising:
a main body receivable in a socket on the firearm;
a locking mechanism coupled to the main body; and
an actuation mechanism coupled to the locking mechanism and depressible in a direction generally perpendicular to a longitudinal axis of the QD sling swivel,
wherein:
when the actuation mechanism is depressed, the locking mechanism is in a first position such that the main body is decouplable from and is freely movable in and out of the socket, and
when the at least one actuation button is not depressed with a portion of the main body received in the socket, the locking mechanism is in a second position such that the main body is interlockingly received in the socket with the locking mechanism engaged therewith.

9. The device of claim 8, wherein the main body is configured with a hollow therein and has a first distal end and a second distal end opposite the first distal end with at least a portion of the main body near the second distal end thereof is receivable in the socket, wherein the locking mechanism comprises a core slidingly movable through the hollow of the main body along a longitudinal axis of the QD sling swivel between an engagement position and a disengagement position, wherein the locking mechanism further comprises at least one detent movable between a first position and a second position in a radial direction perpendicular to the longitudinal axis of the QD sling swivel, wherein the actuation mechanism comprises at least one actuation button coupled to the core and mounted on the first distal end of the main body, wherein, when the at least one actuation button is depressed, the core moves in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket, and wherein, when the at least one actuation button is not depressed with the second distal end of the main body received in the socket, the core is at the engagement position and the main body is interlockingly received in the socket with the at least one detent at the first position.

10. The device of claim 9, wherein the first distal end of the main body is configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

11. The scope mount of claim 10, wherein an angle of the sloped surface is greater than 0 degree and less than 90 degrees relative to a coupling plane which is perpendicular to the longitudinal direction.

12. The scope mount of claim 10, wherein, when the at least one actuation button is depressed, the core moves in the main body in the longitudinal direction from the second distal end toward the first distal end.

13. The scope mount of claim 9, wherein the at least one actuation button comprises a first actuation button and a second actuation button, wherein the actuation mechanism further comprises a spring disposed between the first actuation button and the second actuation button and exerting a force that pushes the first actuation button and the second actuation button away from the longitudinal axis of the QD sling swivel, and wherein the main body is decouplable from the socket when the first actuation button and the second actuation button are depressed in opposite directions towards the longitudinal axis of the QD sling swivel.

14. The device of claim 9, wherein the actuation mechanism further comprises a pin that couples the at least one actuation button and the core together.

15. The device of claim 9, wherein the at least one detent comprises a plurality of ball detents that are at least partially receivable in a groove on an inner wall of the socket when the second distal end of the main body is received in and coupled to the socket, and wherein an outer surface of the core has one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

16. A device implementable on a firearm, comprising:
a quick-disconnect (QD) sling swivel comprising:

a main body with a hollow therein and having a first distal end and a second distal end opposite the first distal end with at least a portion of the main body near the second distal end thereof is receivable in a socket on the firearm;

a locking mechanism coupled to the main body, the locking mechanism comprising a core slidingly movable through the hollow of the main body along a longitudinal axis of the QD sling swivel between an engagement position and a disengagement position; and an actuation mechanism coupled to the locking mechanism, the actuation mechanism comprising at least one actuation button that is depressible in a direction generally perpendicular to a longitudinal axis of the QD sling swivel, wherein the first distal end of the main body is configured with a sloped surface on which the at least one actuation button is slidingly movable toward and away from the longitudinal axis of the QD sling swivel such that, when depressed, the at least one actuation button moves in a direction that is toward the longitudinal axis of the QD sling swivel and away from the second distal end of the main body.

17. The device of claim 16, wherein the locking mechanism further comprises at least one detent movable between a first position and a second position in a radial direction perpendicular to the longitudinal axis of the QD sling swivel, wherein, when the at least one actuation button is depressed, the core moves in the main body in a longitudinal direction along the longitudinal axis of the QD sling swivel from the second distal end toward the first distal end to the disengagement position with the at least one detent at the second position such that the main body of the QD sling swivel is decouplable from and is freely movable in and out of the socket, and wherein, when the at least one actuation button is not depressed with the second distal end of the main body received in the socket, the core is at the engagement position and the main body is interlockingly received in the socket with the at least one detent at the first position.

18. The device of claim 17, wherein the at least one detent comprises a plurality of ball detents that are at least partially receivable in a groove on an inner wall of the socket when the second distal end of the main body is received in and coupled to the socket, and wherein an outer surface of the core has one or more indentations configured to accommodate the plurality of ball detents such that, when the core is at the engagement position, the ball detents are pushed outward by the core to engage with the groove on the socket and, when the core is at the disengagement position, the ball detents are freely movable into the one or more indentations to disengagement from the groove on the socket.

19. The scope mount of claim 16, wherein an angle of the sloped surface is greater than 0 degree and less than 90 degrees relative to a coupling plane which is perpendicular to the longitudinal direction.

20. The scope mount of claim 16, wherein the actuation mechanism further comprises a pin that couples the at least one actuation button and the core together, wherein the at least one actuation button comprises a first actuation button and a second actuation button, wherein the actuation mechanism further comprises a spring disposed between the first actuation button and the second actuation button and exerting a force that pushes the first actuation button and the second actuation button away from the longitudinal axis of the QD sling swivel, and wherein the main body is decouplable from the socket when the first actuation button and the second actuation button are depressed in opposite directions towards the longitudinal axis of the QD sling swivel.

* * * * *